US009025434B2

(12) United States Patent
Maltz et al.

(10) Patent No.: US 9,025,434 B2
(45) Date of Patent: May 5, 2015

(54) AUTOMATED DATACENTER NETWORK FAILURE MITIGATION

(75) Inventors: David A. Maltz, Bellevue, WA (US); Lihua Yuan, Sammamish, WA (US); Ming Zhang, Redmond, WA (US); Xin Wu, Durham, NC (US); Daniel Joseph Turner, Newport Beach, CA (US); Chao-Chih Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 13/617,097

(22) Filed: Sep. 14, 2012

(65) Prior Publication Data

US 2014/0078882 A1   Mar. 20, 2014

(51) Int. Cl.
*H04L 12/24* (2006.01)
*H04L 12/26* (2006.01)

(52) U.S. Cl.
CPC ......... *H04L 41/0654* (2013.01); *H04L 43/0823* (2013.01)

(58) Field of Classification Search
CPC . H04L 41/06; H04L 41/0604; H04L 41/0645; H04L 41/0654; H04L 41/0659; H04L 41/0663; H04L 41/0677; H04L 41/12; H04L 43/0811; H04L 43/0823; G06F 11/2023; G06F 11/2025; G06F 11/2028
USPC .................................................. 370/216, 242
See application file for complete search history.

(56) References Cited

U.S. PATENT DOCUMENTS

| | | | |
|---|---|---|---|
| 7,643,468 B1 * | 1/2010 | Arregoces et al. ............ 370/351 |
| 7,898,940 B2 * | 3/2011 | Asher ........................... 370/216 |
| 7,975,165 B2 | 7/2011 | Shneorson et al. |
| 8,332,690 B1 * | 12/2012 | Banerjee et al. ................. 714/26 |
| 2002/0007468 A1 * | 1/2002 | Kampe et al. ...................... 714/4 |
| 2003/0004744 A1 * | 1/2003 | Greene et al. ...................... 705/1 |
| 2007/0008895 A1 * | 1/2007 | Perkins et al. ................. 370/244 |
| 2007/0083796 A1 * | 4/2007 | Patrizio et al. ................... 714/41 |
| 2008/0037443 A1 | 2/2008 | Ansari et al. |
| 2008/0256384 A1 | 10/2008 | Branson et al. |
| 2009/0024713 A1 * | 1/2009 | Strasenburgh et al. ........ 709/208 |
| 2009/0161533 A1 * | 6/2009 | Ballantyne et al. ........... 370/218 |
| 2009/0307166 A1 | 12/2009 | Routray et al. |
| 2010/0027412 A1 * | 2/2010 | Yang et al. ..................... 370/216 |
| 2010/0076575 A1 * | 3/2010 | Vasko et al. ..................... 700/81 |
| 2010/0324945 A1 * | 12/2010 | Hessing ............................ 705/4 |

(Continued)

OTHER PUBLICATIONS

Gill, et al., "Understanding Network Failures in Data Centers: Measurement, Analysis, and Implications", In Proceedings of the ACM SIGCOMM Conference, Aug. 15-19, 2011, Toronto, Ontario, Canada, 12 pages.

(Continued)

*Primary Examiner* — Min Jung
(74) *Attorney, Agent, or Firm* — Heikki Einola; Judy Yee; Micky Minhas (57) ABSTRACT

The subject disclosure is directed towards a technology that automatically mitigates datacenter failures, instead of relying on human intervention to diagnose and repair the network. Via a mitigation pipeline, when a network failure is detected, a candidate set of components that are likely to be the cause of the failure is identified, with mitigation actions iteratively targeting each component to attempt to alleviate the problem. The impact to the network is estimated to ensure that the redundancy present in the network will be able to handle the mitigation action without adverse disruption to the network.

20 Claims, 6 Drawing Sheets

(56) References Cited

U.S. PATENT DOCUMENTS

| | | | |
|---|---|---|---|
| 2011/0022879 A1 | 1/2011 | Chavda et al. | |
| 2011/0258414 A1* | 10/2011 | Nussbaum et al. | 712/31 |
| 2012/0151246 A1* | 6/2012 | Tanaka | 714/4.1 |
| 2012/0243400 A1* | 9/2012 | Lefrancois et al. | 370/216 |
| 2013/0013957 A1* | 1/2013 | Armstrong et al. | 714/4.12 |
| 2013/0139214 A1* | 5/2013 | Chesla | 726/1 |
| 2013/0219054 A1* | 8/2013 | Birkler et al. | 709/224 |
| 2013/0232382 A1* | 9/2013 | Jain et al. | 714/48 |
| 2013/0291107 A1* | 10/2013 | Marck et al. | 726/23 |
| 2014/0006862 A1* | 1/2014 | Jain et al. | 714/26 |
| 2014/0025770 A1* | 1/2014 | Warfield et al. | 709/213 |

OTHER PUBLICATIONS

Tacca, et al., "Local Detection and Recovery from Multi-Failure Patterns in MPLS-TE Networks", In Proceedings of IEEE International Conference on Communications, Jun. 2006, 6 pages.

Wu, et al., "NetPilot: Automating Datacenter Network Failure Mitigation", SIGCOMM '12, Aug. 13-17, 2012, Helsinki, Finland, 12 pages.

Patterson., et al., "Recovery Oriented Computing (ROC): Motivation, Definition, Techniques, and Case Studies", Computer Science Technical Report UCB//CSD-02-1175, Berkeley Computer Science, Mar. 15, 2002.

\* cited by examiner

AUTOMATED DATACENTER NETWORK FAILURE MITIGATION

BACKGROUND

Datacenter networks often comprise tens of thousands of components including servers, links, switches and routers. To reduce capital expenses, many datacenters are being built with inexpensive commodity hardware. As a result, network failures are relatively frequent, as commodity devices are often unreliable.

Diagnosing and repairing datacenter networks failures in a timely manner is a challenging datacenter management task. Traditionally, network operators follow a three-step procedure to react to network failures, namely detection, diagnosis and repair. Diagnosis and repair are often time-consuming, because the sources of failures vary widely, from faulty hardware components to software bugs to configuration errors. Operators need to consider many possibilities just to narrow down potential root causes.

Although some automated tools exist to help localize a failure to a set of suspected components, operators still have to manually diagnose the root cause and repair the failure. Some of these diagnoses and repairs need third-party device vendors' assistance, further lengthening the failure recovery time. Because of the above challenges, it can take a long time to recover from disruptive failures, even in well-managed networks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which network failures are automatically mitigated. In one aspect, a network is monitored to detect a failure. A component set (one or more network components) that corresponds to the failure is determined. Automated action is taken on the component set to mitigate the failure.

In one aspect, a failure detector processes network state data to determine a state indicative of a network failure. A planner determines a mitigation plan for mitigating the network failure, in which the mitigation plan comprises one or more actions to take to mitigate the network failure. The planner may be coupled to an impact estimator configured to determine an impact if an action is taken, with the planner further configured to adjust the plan based upon the impact. A plan executor accesses the mitigation plan and takes one or more actions identified in the plan on a network component set to mitigate the failure.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards mitigating network failures in an automated manner, where "mitigate" and its variants may refer to taking one or more automated actions that alleviate the symptoms of a network-related failure, possibly at the cost of temporarily reducing spare bandwidth or redundancy. The technology automatically mitigates failures in what can be considered a trial-and-error approach. To this end, the technology detects a failure and identifies a set of one or more suspected faulty components. The suspected devices are iterated through, applying one or more mitigation actions on them one by one, until the failure is mitigated or possible actions are exhausted For example, a set of one or more components may be detected as being the likely cause of a detected failure; the set or individual components thereof may be restarted or deactivated in an attempt to mitigate the failure and get the network fully operational again, without requiring diagnosis and repair (although diagnosis and repair able to be performed at a later time). When coupled with the redundancy that exists in a datacenter network, e.g., extra links and switches to accommodate peak traffic load and device failures, such mitigation of failures may have little impact on the network's normal functions.

In general, a network is monitored for any potential failure, and when a potential failure is detected, a set of one or more suspected components that appear to be malfunctioning is identified. Appropriate mitigation actions are determined and ordered based upon the likelihood of success and/or potential impact. For example, the impact on the network of each planned action being considered may be estimated, so as to avoid taking any action that may adversely impact the network, e.g., further degrade network health. A mitigation plan comprising one or more remaining actions may be then executed. As will be understood, the technology can resolve issues even without precisely localizing a failure and/or precisely ordering the mitigation actions.

Thus, the technology described herein operates to mitigate failures rather than fully diagnosing them and repairing them (until later, if desired). Timely and effective automated failure mitigation enables a datacenter network to operate continuously even in the presence of failures. Because of such mitigation, the technology described herein is able to operate without human intervention and without knowing the precise failure/root cause. Instead, failures may be automatically mitigated through an automated trial-and-error approach.

In one aspect, there is described a network failure mitigation technology, such as arranged as a multiple-stage pipeline, comprising an automated mitigation system configured to quickly mitigate failures in a (typically) large-scale data center network, typically well before operators are able to diagnose and repair the root cause. The system can significantly shorten the failure disruption time by mitigating failures without human intervention, and can also improve the online user experience and lower potential revenue losses that stem from service downtime. Moreover, the failure mitigation technology is able to lower a datacenter's operational costs, as it reduces the number of emergent failures and the number of on-call operators.

It should be understood that any of the examples herein are non-limiting. For example, one implementation showing pipelined components and their structure and functionality is provided for purposes of explanation, however various other configurations, components, implementations, and so forth may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
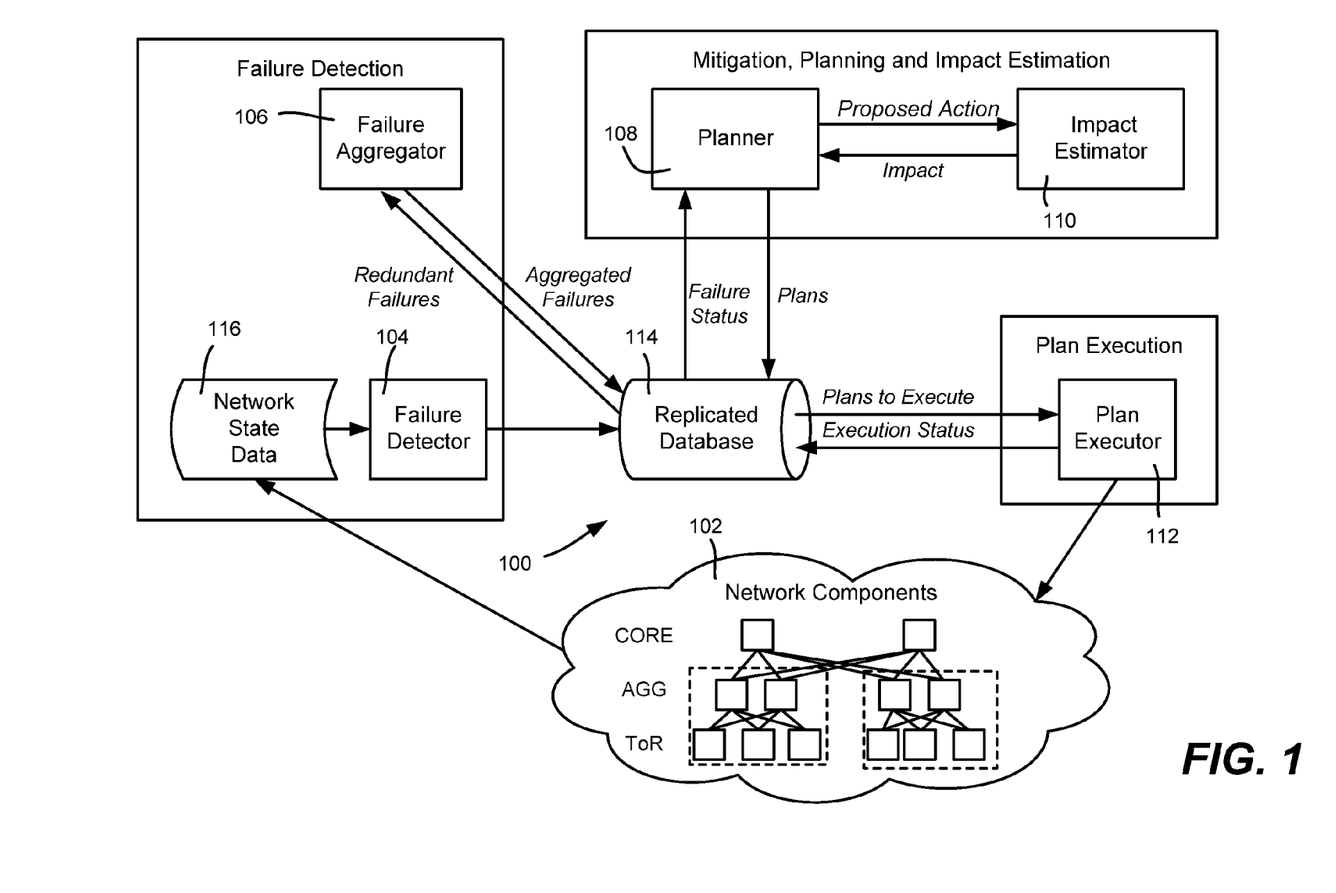
FIG. 1 is a block diagram representing example components of a pipeline configured for automated datacenter network failure mitigation according to one example implementation.

FIG. 1 is a block diagram showing an example implementation comprising a network failure mitigation pipeline 100 coupled to a plurality of network components 102, e.g., arranged in a particularly topology. More particularly, modern datacenter networks typically use a scale-out topology to create many redundant paths between two servers. Known scale-out topologies such as a Fat-Tree and Clos can achieve full bi-section bandwidth using commodity switches that often have low port density. A typical topology has multiple layers, comprising a top-of-rack (ToR) layer, an aggregation layer (AGG), and a core layer (CORE). A container (each represented by the dashed block within the network components 102) is a conceptual management unit as well as a replicable building block sharing the same power and management infrastructure. There are thus ToR switches/routers, AGG switches/router and CORE switches/router that connect to multiple containers.

This scale-out topology provides many paths, sometimes in the hundreds, between any two servers. Such path diversity makes the network resilient to single link, switch, or router failure. For example, deactivating a single link or device, with the exception of a ToR, will not partition the network. Even when a failed ToR causes network partition, the failed ToR only isolates the limited number of servers connected to it.

Datacenter networks also use various protocol level technologies to meet traffic demands even when some devices fail. Practical and well-known technologies that provide load balancing and fast failover at the link, switch, and path level include Link Aggregation Control Protocol (LACP), which abstracts multiple physical links into one logical link and transparently provides high aggregate bandwidth and fast failover at the link level. The resulting logical link is known as a Link Aggregation Group (LAG). LACP provides load balancing by multiplexing packets to physical links by hashing packet headers. Some LACP implementations allow a LAG to initiate from one physical switch but to terminate at multiple physical switches. A LAG can only load balance outgoing traffic but has no control over the incoming traffic.

A virtual switch is a logical switch composed of multiple physical switches. A network can use a virtual switch at the link or the IP layer to mask the failures of physical switches. A virtual switch tolerates faults at the IP layer through an active/standby configuration. One switch is designated as the primary while the standby switch remains silent until it detects that the primary has failed. Two common implementations of IP layer virtual switches are the virtual redundancy router protocol (VRRP) and hot standby router protocol (HSRP). VRRP and HSRP can be configured to provide load balancing. A virtual switch at the link layer differs from its IP layer counterpart by allowing the physical switches to simultaneously forward traffic.

Virtual Port Channel (VPC) and Split Multi-link Trunking are two common implementations. Full-mesh COREs refer to the full-mesh interconnections between COREs and containers, i.e., every container connects to every core switch. The ECMP routing protocols in full-mesh COREs topologies provide load balancing and fast failover for traffic between containers.

Modern datacenter networks also deploy application-level redundancy for fault tolerance. Given that a ToR is a single point of failure for the servers connected to it (unless they are multi-homed), a common technique to increase failure resilience at the application level is to distribute and replicate applications under multiple ToRs. Therefore, stopping or restarting any switch including a ToR is unlikely to have more than a temporary impact on the applications.

In one example implementation represented in FIG. 1, the pipeline comprises five components/stages, (which may be independent processes), including a failure detector 104, a failure aggregator 106, a planner 108, an impact estimator 110 and a plan executor 112. To make the pipeline 102 robust to failures, each stage records relevant state data to a (replicated) database 114 so that the state can survive crashes, as well as be used by other stages. Human or automated operators subsequently also may use the recorded state to determine why the pipeline and/or stage thereof took a specific action.

In one implementation, the failure detector 104 uses network state data 116 comprising a plurality of data sources to detect failures, including SNMP traps, switch and port counters, and syslogs or the like. These state data may be periodically processed, e.g., values from the exemplified data sources may be processed every five minutes, or based upon some other triggering event. The failure detector 104 may apply failure-specific criteria to evaluate whether a failure has occurred. For example, the failure detector 104 may evaluate the bytes-in and dropped-packets counters of a port to determine if a link is overloaded.

When the failure detector 104 detects a failure, the failure detector 104 updates the database 114 with various information, such as the type of detected failure, the data sources that were used to detect the failure, and the components that exhibited abnormal behaviors. Note that the components that exhibited abnormal behaviors are not necessarily the faulty components, because failure effects may propagate to healthy components, e.g., a broken link may cause overload and hence packet losses at other links.

Because the failure detector 104 runs regularly on continuously collected data, whereas some other stages may be based upon a trial-and-error approach, the same failure may be detected multiple times before that failure is mitigated. The failure aggregator 106 provides a mechanism to decide whether a detected failure instance is a new or ongoing failure. To this end, the failure aggregator 106 compares a newly reported failure instance against the ongoing failures recorded in the database 114. If the failure aggregator 106 determines that the newly reported instance has not been mitigated before, e.g., as determined by the failure type and components involved, the failure aggregator 106 updates the database 114 and marks the failure as ready for mitigation. If the failure aggregator 114 has seen the failure and the planner 108 (described below) is taking a mitigation action, the failure aggregator 114 marks the instance as requiring no further action.

If the failure aggregator 114 has seen the failure and the planner 108 has tried a mitigation action for the failure, the failure aggregator 106 flags the failure as unsuccessfully mitigated. The planner 108 may then try the next mitigation action, if there is one available. The failure aggregator 106 does not remove the failure instance created by the failure detector 104, but instead marks that the failure instance has been processed so that an operator can examine the initial failure detection as well as the choices made by the failure aggregator 106 later on.

The planner 108 may take a number of (e.g., three) steps to choose a mitigation action. First, the planner 108 employs failure-specific modules to localize a failure to a set of suspected components. Second, the planner 108 generates appropriate mitigation actions against suspected components. Third, the planner 108 uses the impact estimator 110 to estimate the impact of these actions, ranks them based on their impact or success likelihood, and then executes the highest ranked one; (additional details of impact estimation are described below). At the end of each step, the planner 108 updates the database 114 with its computation results for post-analysis.

Figure 2:
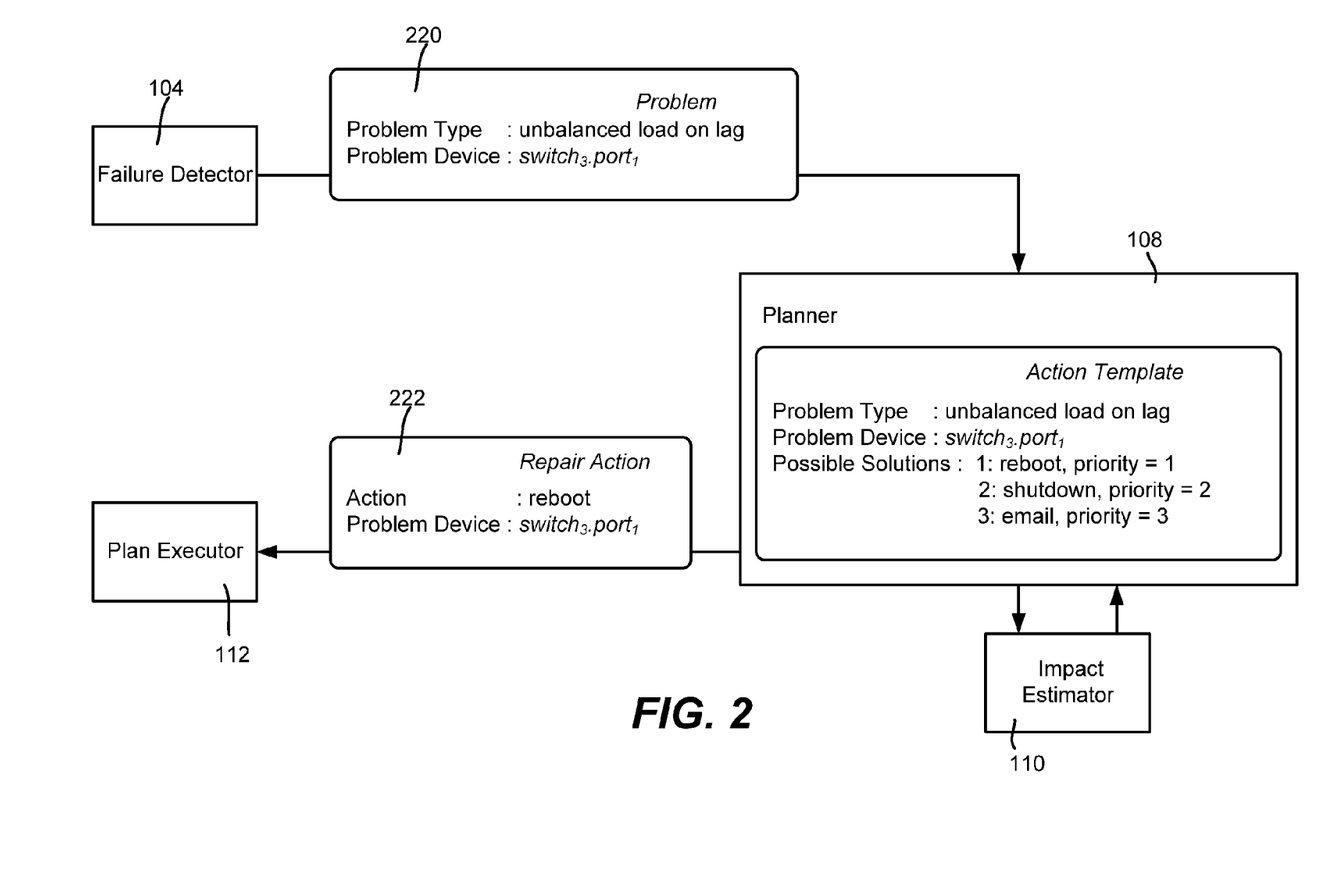
FIG. 2 is a block diagram representing how a switch may learn the equal cost of next hops to any top-of-rack switch for mitigation impact estimation in a hierarchical datacenter network topology according to an example implementation.

By way of example as generally represented in FIG. 2, consider that a problem 220 indicative of a likely failure has been detected by the failure detector 104 and sent to the planner 108. Based upon the type of problem and possibly the device type, the planner 108 chooses (e.g., looks up) a set of possible solutions as proposed mitigation actions. Each proposed mitigation action may be sent to the impact estimator 110, to obtain a result indicative of whether the proposed mitigation action is acceptable to try with respect to its estimated impact. In the example of FIG. 2, the reboot action is acceptable, and thus a repair action 222 is sent to the plan executor (e.g., via the database 114) to execute in an attempt to mitigate the failure.

Once the planner 108 chooses a mitigation action, the plan executor 112 is engaged to take the action on the identified network components. For example, if a switch is the component to be mitigated, the plan executor 112 translates the action (as stored in the database 114) into a series of commands recognized by switches. As such commands are vendor-specific, a vendor-specific file that includes the commands for each mitigation action may be used. Such a file parameterizes configuration arguments such as port number, so that the commands may be reused to take the same action on different switches or ports. A library may be used to allow the plan executor 112 to send commands to switches via both in-band and out-of-band channels. For a switch, example mitigation actions may include restarting a switch, deactivating a port, and so forth.

If an action successfully mitigates the failure, the failure is marked as mitigated. Otherwise, the plan executor 112 may roll back the action (if appropriate) and try the next action. After an action is taken, the plan executor 112 updates the database to record the time when the action was taken and whether the action was successfully applied to the device.

As is understood, the pipeline 102 is capable of mitigating failures without human intervention. Nonetheless, the pipeline 102 is explicitly designed to record the inputs and outputs of each mitigation step in a manner that is readily accessible to operators. Operators can later examine the decisions at each step. This design helps them debug and understand counterintuitive mitigation actions. Moreover, it helps reveal failures that are repeatedly mitigated for only a short period of time.

Turning to additional details of impact estimation, notwithstanding the redundancy in contemporary networks, mitigation actions may overload the network, particularly at times of heavy load. To determine whether a datacenter network has sufficient capacity for failure mitigation, the impact estimator 110 is used. Note that impact estimation needs to be sufficiently accurate in order to avoid actions that may further degrade network health.

Typically, for a given traffic matrix over a time interval T, a datacenter network's health may be assessed via three metrics, namely availability, packet losses and end-to-end latency. The availability and packet losses of a datacenter network may be quantified by the fraction of servers with network connectivity to the Internet (online_server_ratio) and the total number of lost packets (total_lost_pkt) during the interval T respectively. Quantifying latency is not as straightforward because it is difficult to predict how intra-datacenter network latency may change after a mitigation action. Given this problem, the maximum link utilization (max_link_util) may be used across links during the interval T as an indirect measure of network latency. Because the propagation delay is small in a datacenter network (no more than a few milliseconds), low link utilization implies small queuing delay and thus low network latency.

The impact estimator 110 thus aims to estimate a mitigation action's impact on a datacenter network. In one implementation, the impact estimator 110 takes an action A and a traffic matrix TM as two input variables and computes the expected impact of A under TM. Note that computing online_server_ratio given a network topology is straightforward. However, predicting the max_link_util and total_lost_pkt metrics after a mitigation action is nontrivial because the action may change the traffic distribution in the network. Notwithstanding, because of practical and actual datacenter network properties, a coarse-grained TM plus forwarding tables facilitate estimating the real traffic distribution with reasonably high accuracy.

Because a ToR is the basic management unit for a group of servers in most datacenter networks, a TM at the granularity of ToR-to-ToR traffic demands may be represented (instead of a server-to-server). This representation reduces the size of TM while not affecting the computation of traffic distribution at the AGG or CORE layers.

Figure 3:
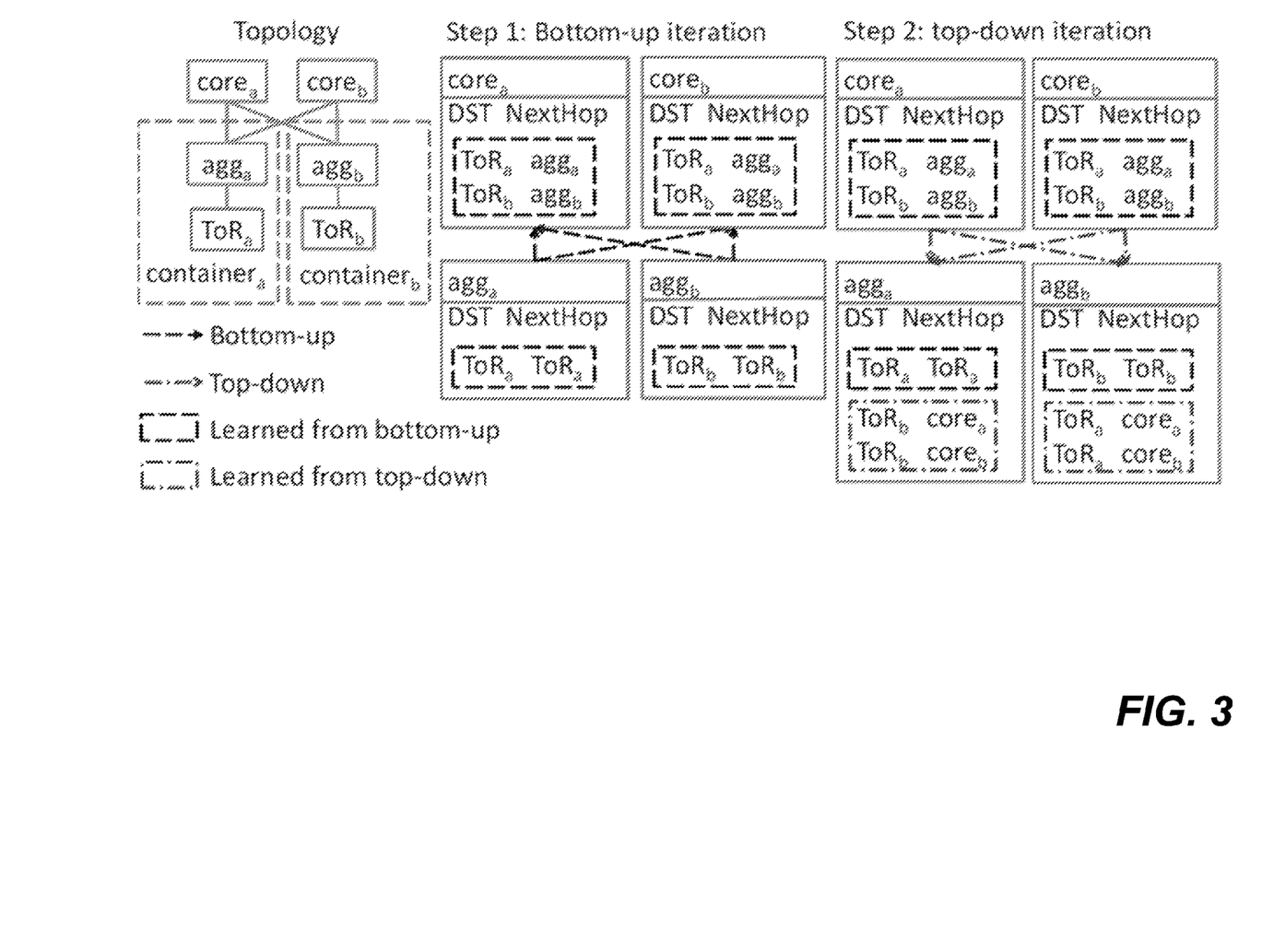
FIG. 3 is an example of how switches learn forwarding information according to an example implementation.

Besides TMs, the forwarding tables are used to know the next hops to any given destination. As a datacenter network typically follows a hierarchical structure with traffic traversing valley-free paths, the forwarding tables may be inferred, as illustrated in FIG. 3. In a first, bottom-up iteration, each switch learns the routes to its descendant ToRs from its direct children. In a second, top-down iteration, each switch learns the routes to the non-descendant ToRs. After these iterations, each switch builds up the full forwarding table to any ToRs in the network.

The impact estimator 110 implements the following algorithm, node.Forward(load), in one example implementation:

```
1: if load.dst == node
2:    return; // reach the destination;
3: nxtHops = Lookup(load.dst)
4: for each node n in nxtHops
5:    for each link l between node and n
6:       subload.dst = load.dst;
```

```
7:  subload.volume = load.volume / |nxtHops| ×1 / |links between
    node and n|;
8:  n.Forward(subload);
```

As used herein, the term "load" refers to the traffic demand between two ToRs. The algorithm represents how a node forwards a load in detail. Line 3 returns the next hops (nxthops) to a destination. Assuming even load balancing for traffic crossing adjacent levels in the network hierarchy, Lines 4-8 first evenly split load among the nxthops, and then for each next hop, the traffic is evenly split among the physical links. The second traffic split is used due to the presence of LAGs. By running this algorithm on each load in TM and aggregating the contribution of each load on each link, the link utilizations are obtained.

Generally described above is how the impact estimator works under a known network topology and TM. To predict the impact of an action, the new topology and TM after the action is committed needs to be known. Although inferring the new topology is straightforward, predicting the new TM is less straightforward because a mitigation action may affect the traffic demand from minutes up to days. For a restart action which takes only several minutes, the TM in the most recent time interval (e.g., ten minutes) may be used to predict the action's impact during the restart period, assuming the TM is unlikely to change dramatically in such a short time. For a deactivation action that may last days, e.g., due to a faulty component needing to be replaced, traffic prediction may be used; instead, however, historical data such as the TMs in the most recent n days before a deactivation event may be used to predict the impact in the future n days, assuming that the traffic demands are stable over 2n days when n is small.

Figure 4:
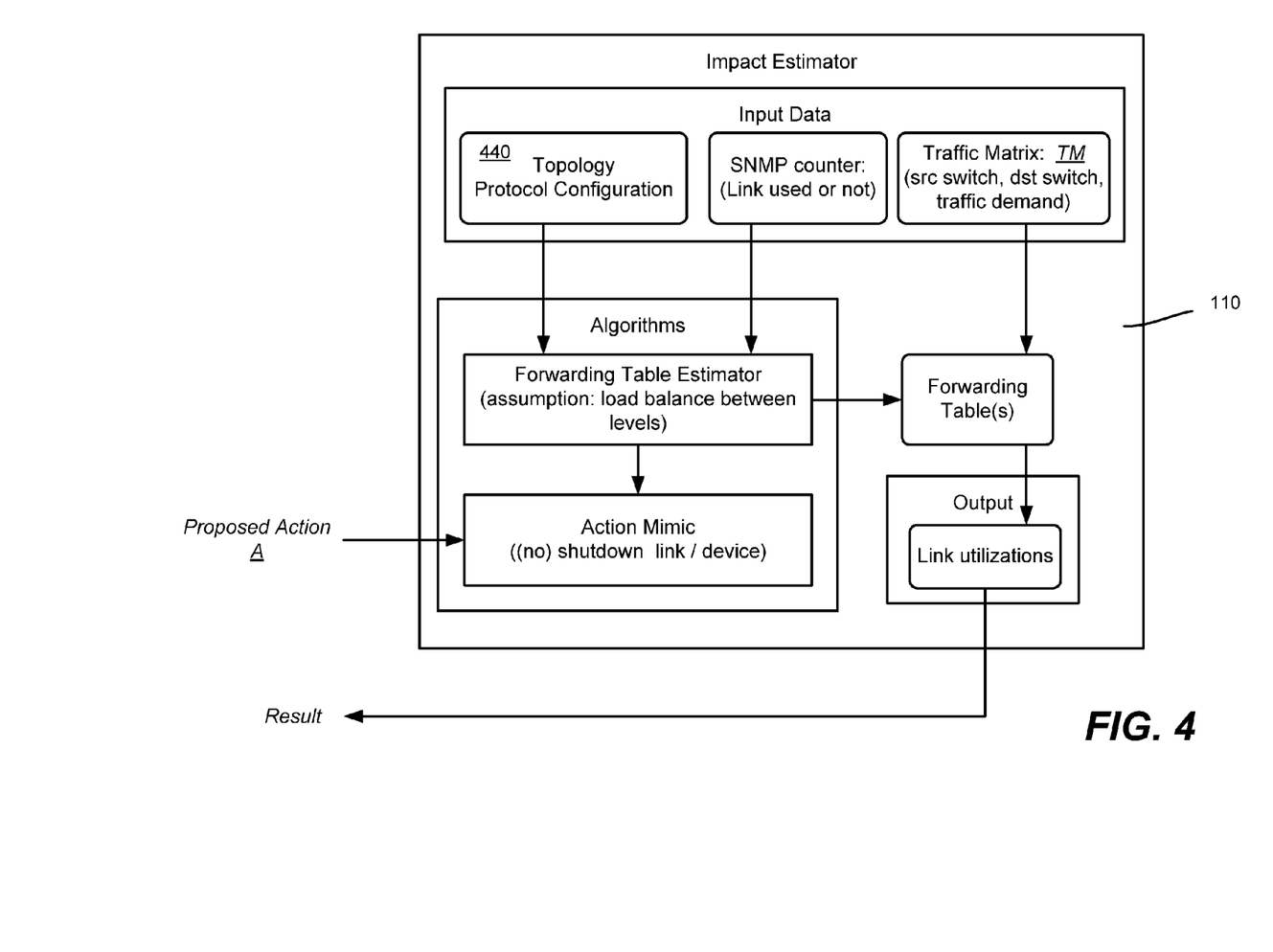
FIG. 4 is an example of inputting and processing a proposed action to output a result corresponding to an estimated impact on the network of performing the action according to an example implementation.

As generally exemplified in FIG. 4, the impact estimator 110 uses the run-time data center network topology 440 and historical TMs in its computations. The run-time topology 440 may be extracted from device configurations and running state (e.g., up/down), and includes both the physical and logical device connections such as a LAG that comprises multiple physical links and a virtual switch that comprises multiple physical switches. The traffic matrices TMs are continuously collected via socket event logs on each server and are aggregated to ToR-to-ToR traffic matrices, e.g., at a ten minute granularity.

As can be readily appreciated, the result from the impact estimator may be in any suitable form for consumption by the planner. For example, the result may comprise a binary "safe" or "unsafe" decision. Alternatively, the impact estimator may return a more granular value, by which the planner may make a decision against a threshold or the like, e.g., with the threshold variable based upon factors such as time of day.

Turning to mitigation planning aspects, as the technology described herein takes a trial-and-error approach toward failure mitigation, in one implementation, a mitigation planner is used to localize suspected components and prioritize mitigation actions to minimize the number of trials. A straightforward way to mitigate is to use known solutions to localizing failures and then iteratively try deactivating or restarting the suspected components. However, also described herein is a more complex way to mitigate that uses failure-specific knowledge to achieve finer-grained localization and more meaningful ordering of mitigation actions (e.g., based on success likelihood), which leads to fewer trials and shorter mitigation times.

The following table sets forth information on various failures, sampled over a six-month period in one datacenter network:

| Category | Detection | Mitigation | Repair | Percentage |
| --- | --- | --- | --- | --- |
| software 21% | link layer loop | deactivate port | update software | 19% |
|  | imbalance triggered overload | restart switch |  | 2% |
| hardware 18% | FCS error | deactivate port | replace cable | 13% |
|  | unstable power | deactivate switch | repair power | 5% |
| unknown 23% | switch stops forwarding | restart switch | n/a | 9% |
|  | imbalance triggered overload | restart switch |  | 7% |
|  | lost configuration | restart switch |  | 5% |
|  | high CPU utilization | restart switch |  | 2% |
| configuration 38% | errors on multiple switches | n/a | update configuration | 32% |
|  | errors on one switch | deativate switch | update configuration | 6% |

Mitigation planning for various types of failures may be used, e.g., planning for frame checksum (FCS) errors, link-down, and uneven-split failures are exemplified herein; other failure types identified in the above table are typically more straightforward to handle.

With respect to frame checksum (FCS) errors, packets can become corrupted, particularly on optical links, which causes a frame to mismatch its checksum; this can significantly degrade performance. Although replacing the faulty cable is likely the solution, in practice this may take days due to cabling complexity, whereby operators usually mitigate such a failure by disabling the faulty link before it is replaced. However, identifying the faulty link is challenging due to the wide use of cut-through switching in datacenter networks. Because cut-through switches forward a packet before checking any checksums, switches can distribute corrupted packets across the entire network before the corrupted packets are detected locally.

To mitigate FCS errors, a solution described herein observes that errors are conserved on cut-through switches that have no faulty links, i.e., the number of incoming corrupted packets matches the number of outgoing corrupted packets. This observation holds because packet losses are uncommon and broadcast/multicast packets account for only a relatively small fraction of the total traffic in datacenter networks. Moreover, the error rate of each faulty link is small and the number of simultaneous faulty links is small, whereby it is unlikely that multiple faulty links contribute to the corruption of one packet. Based on these observations, an FCS error propagation model is designed herein to localize faulty links. To denote link l's corruption rate $x_l$, is used; $p_l$ and $e_l$ represent the total number of packets and the number of corrupted packets traversing l respectively, and $m_{kl}$ represents the fraction of packets coming from link k that also traverse link l. Note that the number of corrupted packets coming from link l is equal to the number of packets corrupted by l plus the number of packets corrupted by other links that traverse l. By ignoring the packets corrupted by multiple links:

$$e_l = \sum_{k \neq l} p_k x_k m_{kl} + p_l x_l \qquad (1)$$

The same technique as that of the impact estimator may be used to compute $m_{kl}$, and $e_l$, $p_k$ and $p_l$ can be obtained from SNMP counters. Thus, the linear equations in (1) provide the same number of constraints as the number of variables ($x_l$'s). If there is a unique solution, the faulty links are those with non-zero $x_l$s. If the solutions are not unique, the one with the smallest number of non-zero $x_l$s may be picked because the number of simultaneous faulty links is usually small.

Other errors referred to as Link-down and Uneven-split Link overloading may occur due to load imbalance or link failure, leading to packet losses and high latencies in datacenter networks. Diagnosing the root causes of link overloading may be difficult because switches are configurable black boxes to operators.

With respect to link-down failures, when one link in a $LAG_x$ is down, the $LAG_x$ redistributes the traffic to the remaining links. Because this process is transparent to higher layer protocols, traffic demands remain the same over $LAG_x$. Thus, $LAG_x$ can become overloaded.

One mitigation strategy is to deactivate the entire $LAG_x$ and have the traffic re-routed via other LAGs to the nxthops (described above). Another strategy is to deactivate all the LAGs (including $LAG_x$) to the nxthops and re-route the traffic via other switches.

With respect to uneven-split failures, due to software or hardware bugs, a switch may unevenly split traffic among the nxthops or the links in a LAG. Extreme traffic imbalances may be observed, such as when one link in a lag carries 5 Gb per second more traffic than any of the other links in the LAG. While the exact root causes may be unknown, operators have found that restarting the LAG or switches on either end rebalances the traffic (at least for some period of time).

Figure 5:
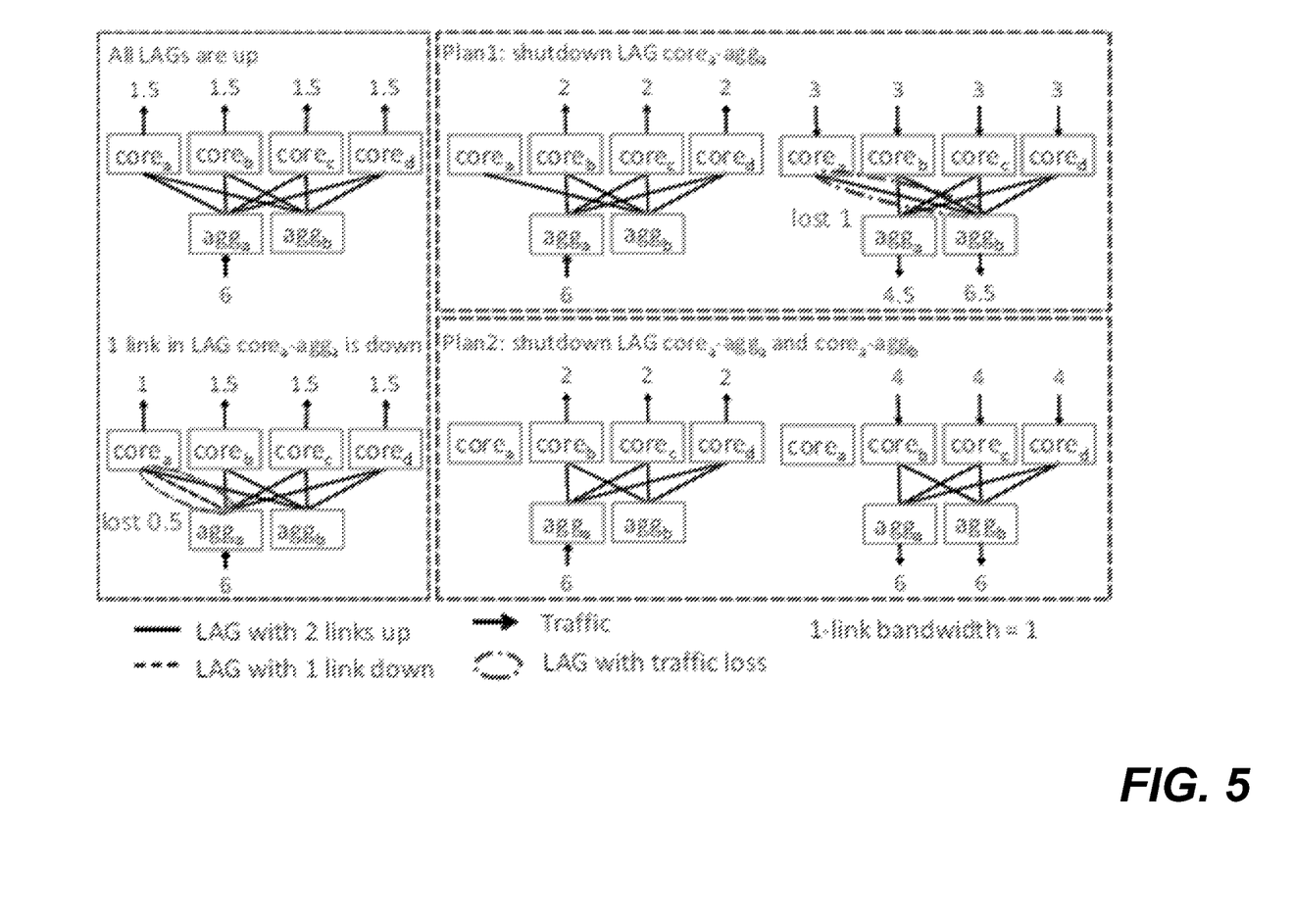
FIG. 5 is a representation of how mitigation plans are able to deactivate link aggregation groups according to an example implementation.

Mitigating a link-down or uneven-split needs to recognize the complexity of the traffic matrix and topology, as exemplified in FIG. 5. Each pair of switches is connected by a LAG having two physical links with a combined capacity of two units. There are six units of upward traffic from $agg_a$ to the cores and twelve units of downward traffic from cores to aggs. Suppose one link between $agg_a$ and $core_a$ is down, halving the corresponding LAG capacity, resulting in 0.5 unit of upward traffic loss.

One mitigation strategy (Plan 1) is to deactivate the entire LAG between $agg_a$ and $core_a$. Although this prevents the upward traffic loss, it causes one unit of downward traffic loss between $core_a$ and $agg_b$. A more desirable strategy described herein also deactivates the LAG between $core_a$ and $agg_b$ (Plan 2). This will shift the downward traffic via $core_a$ to the other cores and prevent traffic loss in both directions.

To mitigate link-down failures, the technology described herein estimates the impact of all possible deactivation actions and carries out the ones with the least impact, that is, minimizing maximum link utilization. Because a link may be down for n days, the impact estimator needs to estimate an action's impact during the downtime. To do so, the impact estimator uses the traffic matrices of the most recent n days as an approximation. Such a computation is difficult for human operators to perform because the number of mitigation actions and traffic matrices to consider in concert could be quite large.

Uneven-split failures are mitigated by restarting LAGs or switches. To limit the temporal interruptions during restarts, the planner prioritizes the restart sequence based on a restart's estimated impact, while also assuming a component cannot carry any traffic during restart. Because restarting one component usually takes only a few minutes, the pipeline uses the traffic matrix in the most recent time interval (e.g., ten minutes) as an approximation of the traffic matrix during the restart. After exhaustively calculating the impact for every possible restart, the planner first carries out the action with the least estimated impact. If this action does not mitigate the failure, the planner reprioritizes the remaining options based on the latest traffic matrix.

Most other failures can be localized via available data sources (such as SNMP counters and syslogs) and can be mitigated via deactivation or restart. The only noted exceptions are the failures due to configuration errors. Although configuration errors on a single switch can be mitigated by deactivating the mis-configured switch, identifying whether a configuration error involves one or multiple switches may require human intervention.

To mitigate link layer loop failures, due to switch software bugs, link layer protocols sometimes never converge and cause severe broadcast storms. This failure can be localized by identifying the switches that become suddenly overloaded but experience little traffic demand increase. One mitigation strategy is to deactivate one of the afflicted ports or switches to restore a loop-free physical topology.

Failures due to unstable power are localized by searching syslogs for unexpected switch-down events. These can be mitigated by deactivating the switches impacted by unstable power.

Failures due to unknown reasons, even if their root causes are unknown, can be easily localized to a single switch and mitigated by a restart. For example, a switch that stops forwarding can be identified once the difference between its received and delivered bytes exceeds a threshold. It is also straightforward to identify a switch that loses its configuration or suffers from high CPU utilization.

EXAMPLE COMPUTING ENVIRONMENT

Figure 6:
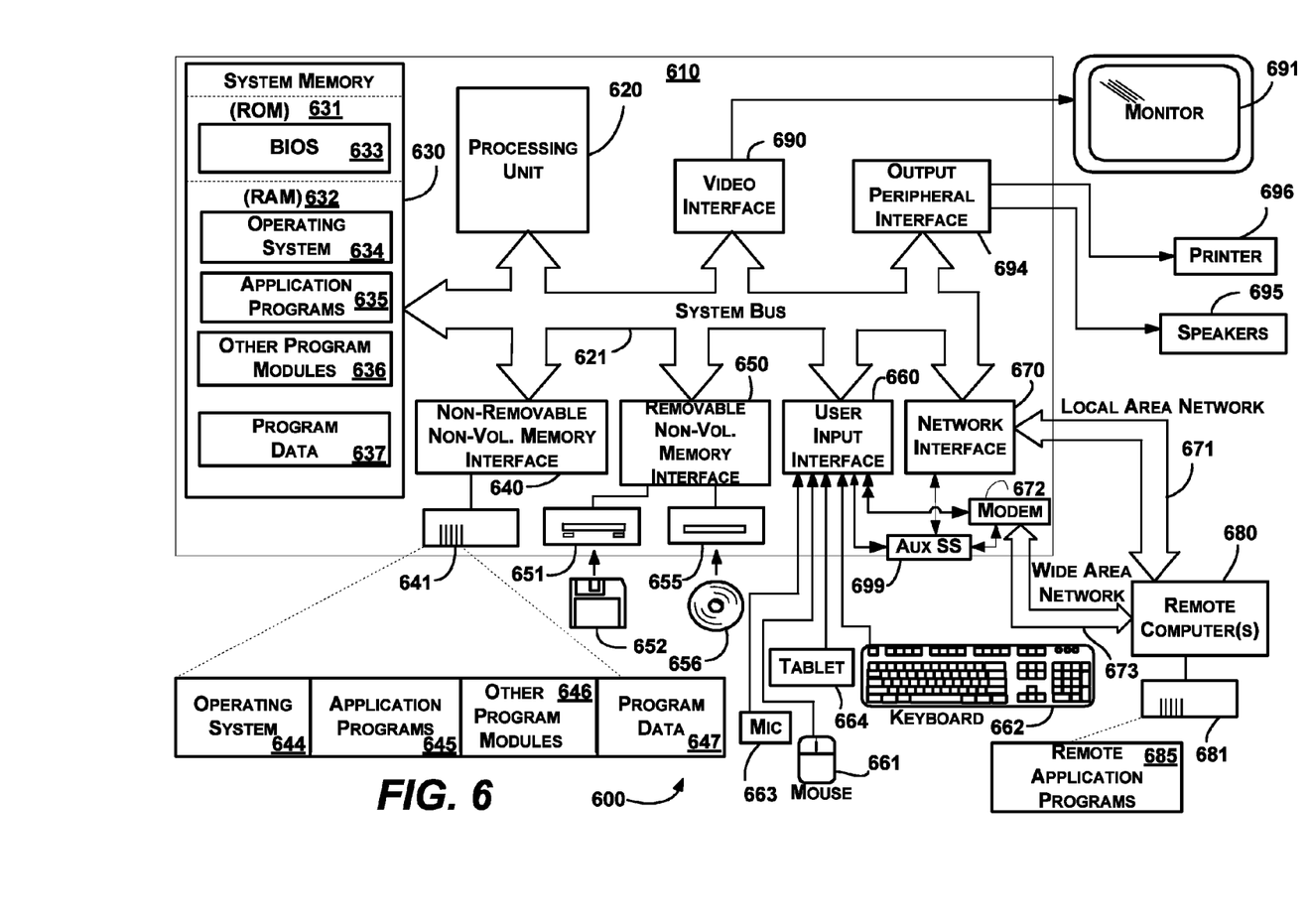
FIG. 6 is a block diagram representing an example non-limiting computing system or operating environment, into which one or more aspects of various embodiments described herein may be implemented.

FIG. 6 illustrates an example of a suitable computing and networking environment 600 into which the examples and implementations of any of FIGS. 1-6 may be implemented, for example. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed at least in part by at least one processor, comprising:
   monitoring a network;
   detecting a failure;
   determining a component set corresponding to the failure, in which the component set comprises one or more suspected faulty components; and
   taking automated action on the component set to mitigate the failure, including when the component set comprises a plurality of components, iterating through one or more of the components applying one or more mitigation actions until the failure is mitigated.

2. The method of claim 1 further comprising, selecting a proposed mitigation action, and estimating an impact on the network before the proposed mitigation action is taken.

3. The method of claim 2 wherein estimating the impact comprises estimating a result of restarting or deactivating a component of the network.

4. The method of claim 3 wherein estimating the impact comprises using at least some historical data.

5. The method of claim 3 wherein estimating the result comprises processing forwarding data to determine at least one hop to a destination.

6. The method of claim 5 further comprising, learning the forwarding data.

7. The method of claim 1 wherein detecting a failure comprises aggregating failure information corresponding to the failure to determine any ongoing mitigation of the failure.

8. The method of claim 1 further comprising providing a plan comprising at least one mitigation action, and wherein taking the action comprises executing the plan.

9. The method of claim 1 wherein taking the action comprises restarting or deactivating at least one component of the component set.

10. The method of claim 1 wherein the failure corresponds to a link-down failure or uneven-split failure, and wherein providing the mitigation plan comprises deactivating or restarting a plurality of link aggregation groups.

11. A system comprising:
    a failure detector configured to process network state data to determine a state indicative of a network failure;
    a planner configured to determine a mitigation plan for mitigating the network failure, the mitigation plan comprising one or more actions to take to mitigate the network failure, including a plan to iterate through a plurality of suspected faulty components to apply one or more mitigation actions to one or more components until the failure is mitigated, the planner coupled to an impact estimator configured to determine an impact if an action is taken, the planner further configured to adjust the plan based upon the impact; and
    a plan executor, the plan executor configured to access the mitigation plan and take one or more actions identified in the plan on a network component set comprising the plurality of suspected faulty components to mitigate the failure.

12. The system of claim 11 wherein the failure detector is coupled to a failure aggregator, the failure aggregator configured to decide whether a detected failure instance corresponds to a new or ongoing failure.

13. The system of claim 11 further comprising a database, the planner coupled to the database to obtain failure data corresponding to the failure and to output the plan to the database.

14. The system of claim 11 wherein the mitigation plan includes a command to restart or deactivate a component, or to deactivate a component if an attempt to restart the component fails to mitigate the failure.

15. The system of claim 11 wherein the component set includes a switch, and wherein the mitigation plan includes a command to restart or deactivate the switch or switch ports, or any combination of commands to restart or deactivate the switch or switch ports.

16. The system of claim 11 wherein the failure detector monitors SNMP data and one or more performance counters, or both, to detect a failure state comprising at least one of: a link layer loop failure, an imbalance triggered overload failure, a frame checksum error, a switch forwarding failure, a lost configuration failure, high CPU utilization, or any other errors on a switch.

17. One or more computer-readable devices having computer-executable instructions, which when executed by at least one computer perform steps, comprising:
    a) determining that a network failure corresponding to a component set has occurred;
    b) providing a mitigation plan, the mitigation plan comprising one or more mitigation actions that if taken on one or more suspected faulty components of the component set are likely to mitigate the failure;
    c) estimating whether a selected action of the mitigation plan, if taken on a component, will adversely impact the network, and if so, discarding that action, and if not, keeping the action for execution;

d) performing the selected action on a suspected faulty component and determining whether the action mitigated the failure, and if so, advancing to step e), and if not, returning to step c) to select another action until the failure is mitigated or no other action in the plan remains to be performed; and e) recording or updating, or both recording and updating, information regarding the failure, the plan, and one or more mitigation-related actions.

18. The one or more computer-readable devices of claim 17 having further computer-executable instructions comprising, aggregating failure instances to decide whether a detected failure instance corresponds to a new or ongoing failure.

19. The one or more computer-readable devices of claim 17 wherein the failure corresponds to a link-down or uneven-split failure, and wherein providing the mitigation plan comprises deactivating or restarting a plurality of link aggregation groups.

20. The one or more computer-readable devices of claim 17 wherein the failure corresponds to a frame checksum error, and having further computer-executable instructions comprising, using a frame checksum error propagation model to localize one or more faulty links.

* * * * *